US010899405B2

(12) United States Patent
Hong

(10) Patent No.: US 10,899,405 B2
(45) Date of Patent: Jan. 26, 2021

(54) BICYCLE BRAKE LOCK DEVICE AND BICYCLE BRAKE ASSEMBLY COMPRISING SAME

(71) Applicant: RAPORTER, Daejeon (KR)

(72) Inventor: Seok Yeong Hong, Seoul (KR)

(73) Assignee: RAPORTER, Daejeon (KR)

( * ) Notice: Subject to any disclaimer, the term of this patent is extended or adjusted under 35 U.S.C. 154(b) by 164 days.

(21) Appl. No.: 16/088,443

(22) PCT Filed: Mar. 30, 2016

(86) PCT No.: PCT/KR2016/003282
§ 371 (c)(1),
(2) Date: Sep. 26, 2018

(87) PCT Pub. No.: WO2017/171119
PCT Pub. Date: Oct. 5, 2017

(65) Prior Publication Data
US 2019/0084633 A1    Mar. 21, 2019

(51) Int. Cl.
*B62H 5/00* (2006.01)
*B62H 5/14* (2006.01)
(Continued)

(52) U.S. Cl.
CPC ............... *B62H 5/147* (2013.01); *B62H 5/18* (2013.01); *B62L 1/12* (2013.01); *B62L 5/18* (2013.01); *B62H 5/148* (2013.01)

(58) Field of Classification Search
CPC . B62H 5/00; B62H 5/147; B62H 5/18; B62H 5/148; B62L 1/12; B62L 5/18
(Continued)

(56) References Cited

U.S. PATENT DOCUMENTS 6,615,956 B1   9/2003  Chuang
8,096,392 B2   1/2012  Edwards et al.
(Continued)

FOREIGN PATENT DOCUMENTS

CN   2427398     4/2001
CN   201447037   5/2010
(Continued)

OTHER PUBLICATIONS

International Search Report for PCT/KR2016/003282 dated Dec. 13, 2016 and its English translation from WIPO.
(Continued)

*Primary Examiner* — Suzanne L Barrett
(74) *Attorney, Agent, or Firm* — Ladas & Parry, LLP

(57) ABSTRACT

A bicycle brake lock device and a bicycle brake assembly comprising the same. The device comprises a separate lock means that can restrain a first and a second rotation link of a bicycle brake in a brake operating state to prevent the rotation thereof. Therefore, even without a separate lock device such as a lock, the lock means can simply operate in a lock mode to make the riding of a bicycle impossible, and thus can prevent the bicycle from being stolen. Also, a user can safely fix and restrain a bicycle through a lock means by carrying only a lock key without carrying a separate big and heavy lock device, and thus more conveniently use the bicycle. In particular, a bicycle can be prevented from being stolen even by use of a tool such as a cutter, and thus achieves an enhanced safety from the bicycle theft.

4 Claims, 9 Drawing Sheets

(51) Int. Cl.
*B62L 1/12* (2006.01)
*B62L 5/18* (2006.01)
*B62H 5/18* (2006.01)

(58) Field of Classification Search
USPC .................................................. 70/226, 233
See application file for complete search history.

(56) References Cited

U.S. PATENT DOCUMENTS

| | | | |
|---|---|---|---|
| 10,207,767 B2* | 2/2019 | Dunlap, III | ............. B62L 3/023 |
| 2005/0205363 A1* | 9/2005 | Peles | ..................... B60T 8/3225 |
| | | | 188/24.11 |
| 2008/0053766 A1 | 3/2008 | Costa | |
| 2009/0078512 A1 | 3/2009 | Edwards et al. | |
| 2011/0169245 A1* | 7/2011 | Fulghum | ................ B60T 7/104 |
| | | | 280/264 |

FOREIGN PATENT DOCUMENTS

| | | | | |
|---|---|---|---|---|
| DE | 283 712 | 2/1914 | | |
| DE | 426 757 | 3/1926 | | |
| EP | 0 015 878 | 9/1980 | | |
| EP | 1645498 A1 * | 4/2006 | ............... B62L 3/06 | |
| FR | 881 681 | 5/1943 | | |
| FR | 892 637 | 5/1944 | | |
| GB | 190916991 | 12/1909 | | |
| KR | 10-1220114 | 1/2013 | | |
| KR | 10-2015-0010378 | 1/2015 | | |
| KR | 1726419 * | 4/2017 | ............... B62H 5/18 | |
| KR | 2019092150 * | 8/2019 | ............... B62H 5/18 | |
| TW | 562013 | 11/2003 | | |
| WO | WO-2018230791 A1 * | 12/2018 | ............... B62H 5/18 | |

OTHER PUBLICATIONS

Written Opinion of the International Searching Authority for PCT/KR2016/003282 dated Dec. 13, 2016 and its English machine translation by Google Translate.

Office Action dated Sep. 16, 2019 for Chinese Application No. 201680084089.1 and its English machine translation by Google Translate.

Extended European Search Report dated Mar. 14, 2019 for European Patent Application No. 16897140.6.

International Preliminary Report on Patentability (Chapter I) for PCT/KR2016/003282 dated Oct. 2, 2018 and its English translation from WIPO.

* cited by examiner

US 10,899,405 B2

BICYCLE BRAKE LOCK DEVICE AND BICYCLE BRAKE ASSEMBLY COMPRISING SAME

CROSS-REFERENCE TO RELATED APPLICATIONS

This application is the U.S. National Stage of International Patent Application No. PCT/KR2016/003282 filed on Mar. 30, 2016, which claims the priority to Korean Patent Application No. 10-2016-0038704 filed in the Korean Intellectual Property Office on Mar. 30, 2016, the entire contents of which are incorporated herein by reference.

TECHNICAL FIELD

The present disclosure relates to a bicycle brake locking device and a bicycle brake assembly including the same. More particularly, the present disclosure relates to a bicycle brake locking device and a bicycle brake assembly including the same, in which the bicycle brake locking device includes a separate locking unit for restraining first and second pivot links of a bicycle brake from rotating to remain in a brake-operating position. This configuration makes it possible to prevent a bicycle from moving by simply converting the locking unit to a lock mode without a separate locking device, such as a lock, thereby protecting the bicycle from theft. It is possible to safely fix and restrain a bicycle using the locking unit by only carrying a key, without carrying a separate locking device, which may be bulky and heavy, so that the bicycle can be used more conveniently. In particular, it is possible to more safely protect a bicycle from theft in a situation in which a tool, such as a cutter, is used.

BACKGROUND ART

In general, a bicycle is a transportation device that has a light body and is relatively easy to ride, such that a rider can flexibly respond to road conditions. In particular, bicycles are not only a form of pollution-free transportation, but are also widely used for physical training. However, bicycles are popular targets for theft, due to the lightness of their bodies.

In the related art, a variety of locking devices have been used to protect bicycles from theft. Typical locking devices of the related art generally involve connecting a plurality of bicycle frames using a locking unit, such as a lock, provided on both ends of a metal cable or a chain, or fixing a bicycle to a fixed structure.

However, locking devices of the related art have the following problems.

Such approaches are inconvenient, since a separate locking device for locking a bicycle must always be carried, and may have low portability and storability, due to the weight and volume of the locking device. In particular, storage spaces of bicycles are too limited to accommodate a locking device including a metal cable or a chain. It is therefore inconvenient to use such locking devices.

In addition, it is inconvenient to fix a bicycle to a stationary structure using a locking device of the related art, since both ends of a metal cable or a chain must be fastened using the locking device such that the metal cable or a chain can secure a wheel or a frame of the bicycle, as well as the stationary structure.

Furthermore, recently, thefts, stealing a bicycle by cutting a metal cable or a chain of the bicycle using a cutter, have become frequent. In the case of a theft in which a cutter is used, it is difficult to prevent the theft using the locking device of the related art.

DISCLOSURE

Technical Problem

Accordingly, the present disclosure has been made in consideration of the above-described problems occurring in the related art, and the present disclosure proposes a bicycle brake locking device and a bicycle brake assembly including the same, in which the bicycle brake locking device includes a separate locking unit for restraining first and second pivot links of a bicycle brake from rotating to remain in a brake-operating position. This configuration makes it possible to prevent a bicycle from moving by simply converting the locking unit to a lock mode without a separate locking device, such as a lock, thereby protecting the bicycle from theft. It is possible to safely fix and restrain a bicycle using the locking unit by only carrying a key, without carrying a separate locking device, which may be bulky and heavy, so that the bicycle can be used more conveniently.

Provided are a bicycle brake locking device and a bicycle brake assembly including the same, in which a locking unit is configured to be coupled to first and second pivot links to directly rotate the first and second pivot links. Then, even in the case that brake wires are cut, the restraint of the first and second pivot links from rotating is maintained as is, so that the bicycle brake is not released from the operating position, thereby making it impossible to easily steal the bicycle, even if a cutter is used, except for removing the bicycle by lifting the bicycle. Accordingly, it is possible to more reliably prevent theft.

Provided are a bicycle brake locking device and a bicycle brake assembly including the same, in which a separate fastener having a specific pattern is provided to couple first and second pivot links to a bicycle frame while maintaining the first and second pivot links to be rotatably coupled to each other. Since it is impossible to unfasten the fastener using a dedicated tool corresponding to the specific pattern, no person, except for a bicycle owner, can detach the bicycle brake from the bicycle frame. It is therefore possible to reliably maintain the restraint of a bicycle wheel.

Technical Solution

According to an aspect of the present disclosure, provided is a bicycle brake locking device for restraining a bicycle brake in an operating position. The bicycle brake includes first and second pivot links coupled to each other to be rotatable about a rotary shaft and brake pads coupled to predetermined ends of the first and second pivot links, the first and second pivot links being rotated to press the brake pads against a bicycle wheel when the bicycle brake is manipulated by a user. The bicycle brake locking device includes a locking unit coupled to both the first and second pivot links to restrain the first and second pivot links from rotating in a state in which the first and second pivot links have been rotated to press the brake pads against the bicycle wheel. The locking unit selectively operates in a lock mode to restrain the first and second pivot links from rotating or a release mode to release rotational restraint of the first and second pivot links when manipulated by a user using a key.

The locking unit may include: a first locking body provided on a portion of the first pivot link to rotate integrally with the first pivot link; a second locking body provided on a portion of the second pivot link to overlap the first locking body so as to rotate integrally with the second pivot link; and a key block fixed to the first locking body and extending through and coupled to both the first locking body and the second locking body, the key block being configured to be manipulated using the key. When the first and second pivot links are rotated to the operating position of the bicycle brake in a state the key block has been manipulated to a lock mode, the first and second locking bodies are restrained from rotating.

The locking unit may further include: a rotational engagement member coupled to the key block to rotate and move integrally with the key block when the key block is rotationally manipulated, and having an engagement portion provided on a portion thereof; and a stepped portion provided on the second locking body to be engaged with the engagement portion of the rotational engagement member when the first and second pivot links are rotated to the operating position of the bicycle brake in the state in which the key block has been rotationally manipulated to the lock mode. As the engagement portion and the stepped portion are engaged with each other, the first and second pivot links are restrained from rotating, remaining in the operating position of the bicycle brake.

The rotational engagement member may be elastically pressed using a separate elastic member, in a direction in which the rotational engagement member is in close contact with a surface of the second locking body, on which the stepped portion is provided.

The stepped portion may have an incline surface portion. In a process of engagement between the engagement portion of the rotational engagement member and the stepped portion, the engagement portion of the rotational engagement member may move relatively along the incline surface portion to be engaged with the stepped portion.

According to another aspect of the present disclosure, a bicycle brake assembly may include: the above-described bicycle brake locking device; and a fastener coupling the first and second pivot links to the bicycle frame while maintaining the first and second pivot links to be rotatably coupled to each other. The fastener includes a fastening bolt extending through and fitted to at least one of the first and second pivot links to extend through the bicycle frame and a fastening nut screw-engaged with the fastening bolt, wherein a head of the fastening bolt or the fastening nut has a specific pattern such that the fastening bolt or the fastening nut is manipulated using a dedicated tool.

A catch recess may be provided in an outer circumferential surface portion of one end of the fastening bolt. An anti-separation bolt may extend through one of the first and second pivot links to be fitted into the catch recess of the fastening bolt.

Advantageous Effects

As set forth above, the separate locking unit can restrain the first and second pivot links of the bicycle brake from rotating to remain in a brake-operating position. This configuration makes it possible to prevent a bicycle from moving by simply converting the locking unit to the lock mode without a separate locking device, such as a lock, thereby protecting the bicycle from theft. It is possible to safely fix and restrain a bicycle using the locking unit by only carrying a key, without carrying a separate locking device, which may be bulky and heavy, so that the bicycle can be used more conveniently.

In addition, the locking unit is configured to be coupled to first and second pivot links to directly rotate the first and second pivot links. Then, even in the case that brake wires are cut, the restraint of the first and second pivot links from rotating is maintained as is, so that the bicycle brake is not released from the operating position, thereby making it impossible to easily steal the bicycle, even if a cutter is used, except for removing the bicycle by lifting the bicycle. Accordingly, it is possible to more reliably prevent theft.

Furthermore, since the bicycle brake is restrained in the operating position by the locking unit, i.e. the brake pads are restrained from rotating while remaining pressed against a bicycle wheel, the bicycle wheel remains restrained by the brake device unless the locking unit is converted to the release mode. This can accordingly prevent a theft in which only bicycle wheels are stolen.

The separate fastener having a specific pattern is provided to couple first and second pivot links to a bicycle frame while maintaining the first and second pivot links to be rotatably coupled to each other. Since it is impossible to unfasten the fastener using a dedicated tool corresponding to the specific pattern, no person, except for a bicycle owner, can detach the bicycle brake from the bicycle frame. It is therefore possible to reliably maintain the restraint of a bicycle wheel.

MODE FOR INVENTION

Figure 1:
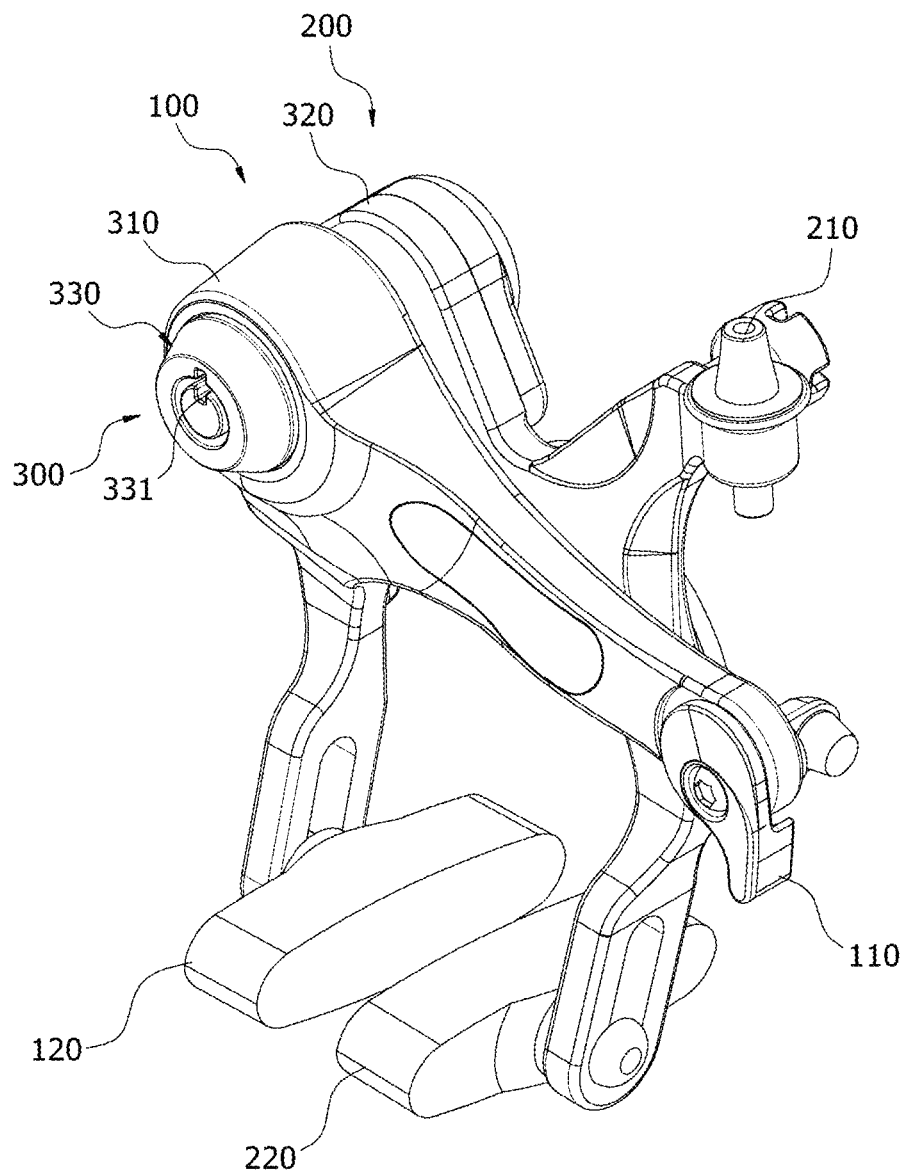
FIG. 1 is a front perspective view schematically illustrating an appearance of a bicycle brake assembly including a bicycle locking device according to an exemplary embodiment.

Hereinafter, reference will be made to embodiments of the present disclosure in detail, examples of which are illustrated in the accompanying drawings. Throughout this document, reference should be made to the drawings, in which the same reference numerals and symbols will be used to designate the same or like components. In the following description of the present disclosure, detailed descriptions of known functions and components incorporated herein will be omitted in the case that the subject matter of the present disclosure may be rendered unclear thereby.

Figure 2:
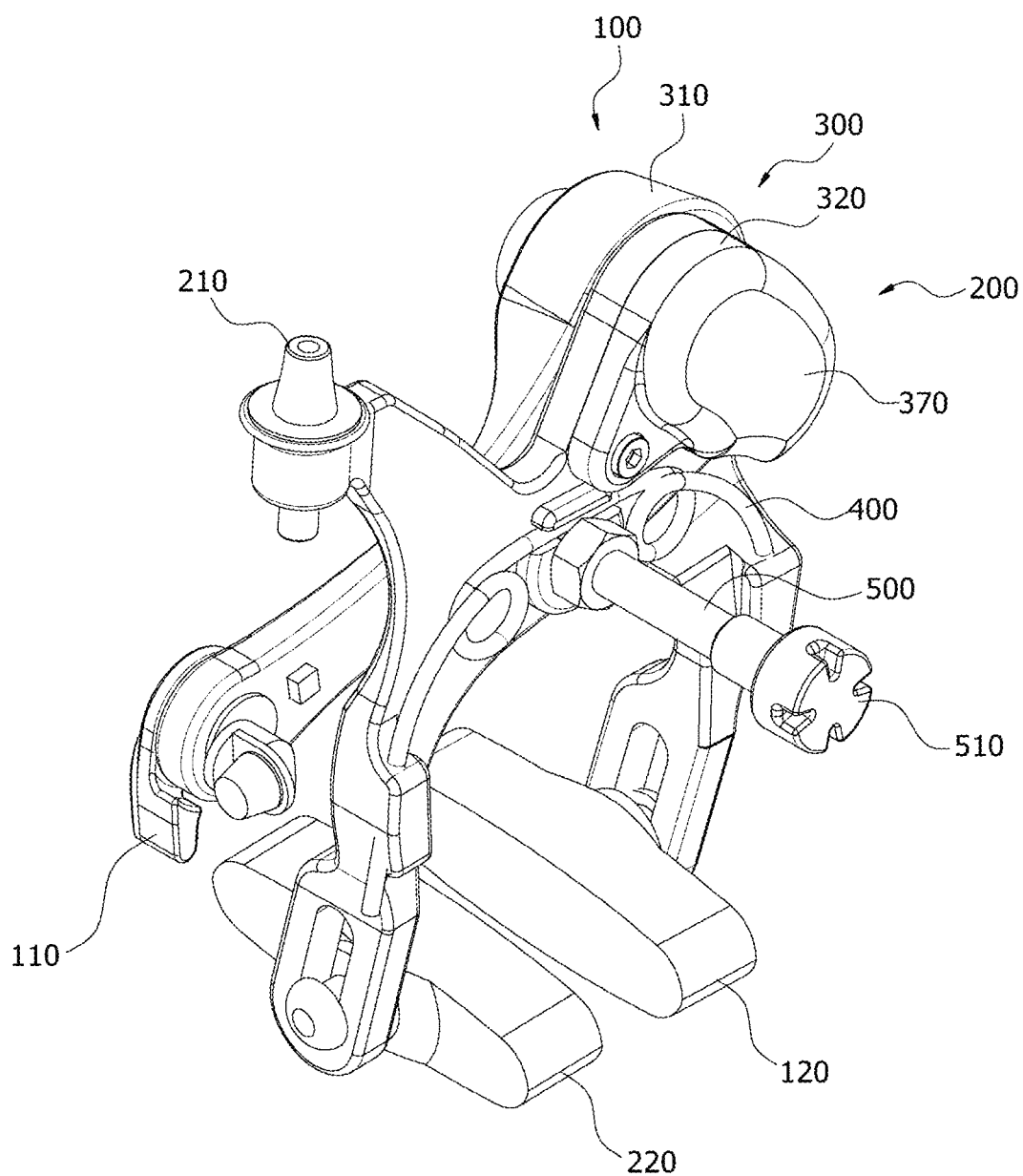
FIG. 2 is a rear perspective view schematically illustrating the appearance of the bicycle brake assembly including a bicycle locking device according to an exemplary embodiment.
Figure 3:
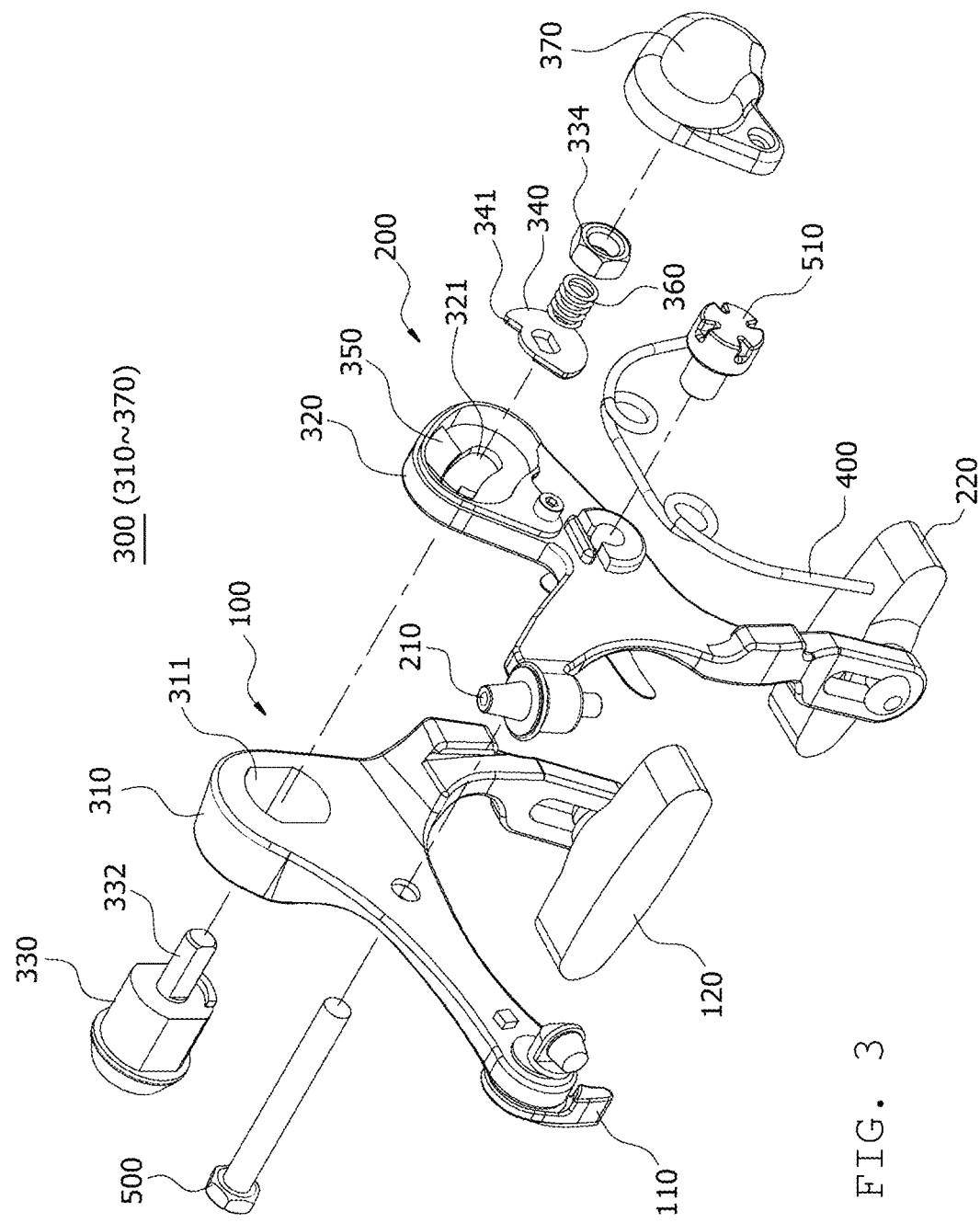
FIG. 3 is an exploded perspective view schematically illustrating a configuration of the bicycle brake assembly including a bicycle locking device according to an exemplary embodiment.
Figure 4:
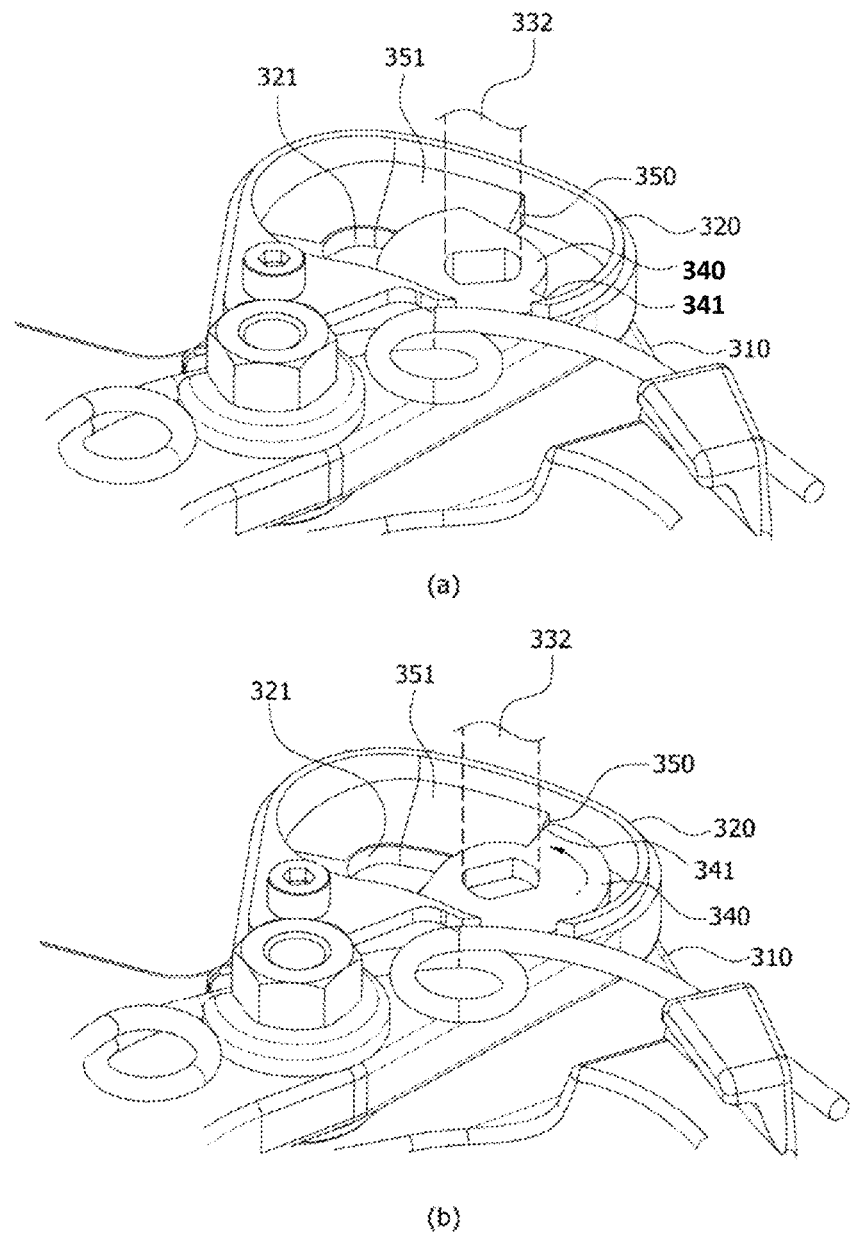
FIG. 4 illustrates an operating structure of the bicycle locking device according to an exemplary embodiment.

FIG. 1 is a front perspective view schematically illustrating an appearance of a bicycle brake assembly including a bicycle locking device according to an exemplary embodiment, FIG. 2 is a rear perspective view schematically illustrating the appearance of the bicycle brake assembly including a bicycle locking device according to an exemplary embodiment, FIG. 3 is an exploded perspective view schematically illustrating a configuration of the bicycle brake assembly including a bicycle locking device according to an exemplary embodiment, and FIG. 4 illustrates an operating structure of the bicycle locking device according to an exemplary embodiment.

First, an operating structure of a bicycle brake will be described in detail. First and second pivot links 100 and 200 are coupled to each other so as to be rotatable about a rotary shaft 500. Brake pads 120 and 220 are coupled to predetermined ends of the first and second pivot links 100 and 200, respectively. The brake pads 120 and 220 can be pressed against a bicycle wheel. The first and second pivot links 100 and 200 are rotated when a brake lever (not shown) attached to a bicycle is manipulated. Operating wires (not shown) extending from the brake lever are connected to the first and second pivot links 100 and 200, such that the first and second pivot links 100 and 200 can be rotated by pulling force applied thereto via the operating wires. The first and second pivot links 100 and 200 have wire mounting portions 110 and 210, respectively, to which the operating wires can be connected. The first and second pivot links 100 and 200 are coupled to each other so as to be elastically rotated in a brake release direction by a separate elastic spring 400. The first and second pivot links 100 and 200 operate to rotate in the direction opposite to the elastic force of the elastic spring 400, in response to the lever being manipulated by a user, so that the brake pads 120 and 220 are pressed against the bicycle wheel. When the brake pads 120 and 220 are pressed against the bicycle wheel, frictional force of the brake pads 120 and 220 stops the bicycle wheel from moving.

Here, the rotary shaft 500 not only acts as a center of rotation of the first and second pivot links 100 and 200, but also connects the bicycle brake assembly to a bicycle frame. That is, the bicycle brake assembly including the first and second pivot links 100 and 200 is connected to a bicycle frame via the rotary shaft 500. In this case, the rotary shaft 500 may be in the form of a fastening bolt, with threads being provided on a portion thereof, such that the rotary shaft 500 can be coupled to the bicycle frame via a separate fastening nut 510.

The rotary shaft 500 may be provided as a single rotary shaft, as illustrated in FIGS. 1 to 3. Alternatively, two rotary shafts may be provided, allowing the first and second pivot links 100 and 200 to rotate about different axes of rotation. A pivot structure including a single rotary shaft is referred to as a single pivot structure, while a pivot structure including two rotary shafts is referred to as a dual pivot structure. Descriptions of a brake structure will be omitted, since the brake structure is a caliper brake mechanism, which is widely used. The locking device according to the present disclosure is applicable to both the single pivot structure and the dual pivot structure. Hereinafter, the locking device according to the present disclosure will be described as being used in the single pivot structure for the sake of brevity.

The bicycle brake locking device according to an exemplary embodiment includes a locking unit 300 for restraining the first and second pivot links 100 and 200 from rotating, as a device for restraining the bicycle brake in the operating position when the bicycle brake has been operated.

The locking unit 300 is coupled to both the first and second pivot links 100 and 200. In a state in which the first and second pivot links 100 and 200 have been rotated to a bicycle brake-operating position to press the brake pads 120 and 220, coupled to the first and second pivot links 100 and 200, against the bicycle wheel, the locking unit 300 can restrain the first and second pivot links 100 and 200 from rotating.

The locking unit 300 operates in a lock mode to restrain the first and second pivot links 100 and 200 from rotating and a release mode to release the rotational restraint of the first and second pivot links 100 and 200. The locking unit 300 selectively operates in the lock mode or the release mode, in response to a user manipulating the locking unit 300 using a separate key.

Restraining the first and second pivot links 100 and 200 in the brake-operating position using the locking unit 300 can simply cause the locking unit 300 to operate in the lock mode without a separate locking device, such as a lock, thereby protecting the bicycle from theft.

In particular, the locking unit 300 according to an exemplary embodiment is configured to be coupled to the first and second pivot links 100 and 200 to directly rotate the first and second pivot links 100 and 200. Then, even in the case that the brake wires are cut, the restraint of the first and second pivot links 100 and 200 from rotating is maintained as is, so that the bicycle brake is not released from the operating position, thereby making it impossible to easily steal the bicycle, even if a cutter is used, except for removing the bicycle by lifting the bicycle. Accordingly, it is possible to more reliably prevent theft.

In addition, a typical bicycle locking device may use an annular locking structure for fixing the bicycle frame to a separate stationary structure. This approach is intended to protect the bicycle from being carried away by fixing the bicycle to a stationary structure using a locking device. However, this approach is subject to a theft in which only bicycle wheels are stolen. In contrast, in the locking unit 300 according to an exemplary embodiment, since the first and second pivot links 100 and 200 are restrained from rotating in the brake-operating position, i.e. in the state in which the brake pads 120 and 220 are pressed against the bicycle wheel, the bicycle wheel is restrained by the brake device unless the locking unit 300 is converted to the release mode. This can accordingly prevent a theft in which only bicycle wheels are stolen.

In addition, it is possible to fixedly restrain the bicycle using the locking unit by only carrying the key without carrying the separate locking device, which may be bulky and heavy. Accordingly, the bicycle can be more conveniently used.

Hereinafter, the configuration of the locking unit 300 according to an exemplary embodiment will be described in more detail.

The locking unit 300 may include a first locking body 310 provided on a portion of the first pivot link 100 to rotate integrally with the first pivot link 100; a second locking body 320 provided on a portion of the second pivot link 200 to overlap the first locking body 310 so as to rotate integrally with the second pivot link 200; and a key block 330 fixed to the first locking body 310 and extending through and coupled to both the first locking body 310 and the second locking body 320. The key block 330 can be manipulated using the key. The first locking body 310 has a key block coupling-hole 311 into which the key body 330 can be fitted. The second locking body 320 has a guide hole 321 allowing an operating rod 332 of the key block 330 to rotate and move therethrough in a position in which the operating rod 332 extends through the guide hole 321. The key block 330 may have a key manipulation hole 331 in a front portion thereof, and the operating rod 332 may protrude inwardly from the key block 330. The operating rod 332 rotates integrally with the key when the key is rotationally manipulated.

In this case, when the first and second pivot links 100 and 200 are rotated to the bicycle brake-operating position in a state in which the key block 330 has been manipulated to a lock mode using the key, the first and second locking bodies 310 and 320 are restrained from rotating.

In addition, the locking unit 300 may further include a rotational engagement member 340 and a stepped portion 350. The rotational engagement member 340 is coupled to the key block 330 to rotate and move integrally with the key block 330 when key block 330 is rotationally manipulated, and has an engagement portion 341 provided on a portion thereof. The stepped portion 350 is provided on the second locking body 320. When the first and second pivot links 100 and 200 are rotated in the bicycle brake-operating position in the state in which the key block 330 has been rotationally manipulated to the lock mode, the stepped portion 350 is engaged with the engagement portion 341 of the rotational engagement member 340. As the engagement portion 341 and the stepped portion 350 are engaged with each other, the first and second pivot links 100 and 200 are restrained from rotating, thereby remaining in the bicycle brake-operating position.

The operating rod 332 of the key block 330 extends through and is fitted into the rotational engagement member 340, and a separate nut 334 is coupled to a distal end of the operating rod 332 to fix the rotational engagement member 340. A separate finishing cover 370 may be coupled to an externally-exposed surface of the second locking body 320 to externally shield and protect the engagement portion 341 and the stepped portion 350.

Here, the rotational engagement member 340 may be elastically pressed using a separate elastic member 360, in a direction in which the rotational engagement member 340 is in close contact with a surface of the second locking body 320, on which the stepped portion 350 is provided. This configuration may be provided by positioning the elastic member 360, having the shape of a coil spring, between the rotational engagement member 340 and the nut 334, and disposing the operating rod 332 to extend through and be fitted into the elastic member 360.

One surface of the stepped portion 350 is provided as an incline surface 351. In the process of engagement between the engagement portion 341 of the rotational engagement member 340 and the stepped portion 350, the engagement portion 341 of the rotational engagement member 340 moves relatively along the incline surface 351 to be engaged with the stepped portion 350.

Referring to FIG. 4, (a) illustrates the locking unit 300 operating in the release mode, while (b) illustrates the locking unit 300 operating in the lock mode. In these cases, the first and second pivot links 100 and 200 have been rotated to a brake-operating position. When the locking unit 300 is in the release mode, as illustrated in FIG. 4(a), a partial area of the rotational engagement member 340 is located above an area of the incline surface 351 of the stepped portion 350. When the locking unit 300 is converted to the operating mode, as illustrated in FIG. 4(b), the rotational engagement member 340 rotates together with the operating rod 332, so that the engagement portion 341 is engaged with the stepped portion 350. Since the partial area of the rotational engagement member 340 is then caused to move along the incline surface 351 of the stepped portion 350, the rotational engagement member 340 can move smoothly without interference during rotation, and engagement coupling between the engagement portion 341 and the stepped portion 350 is reliably performed.

Maintaining the bicycle brake in the operating position using the locking unit 300 is performed by rotationally manipulating the locking unit 300 into the lock mode using the key and then pulling the brake lever, thereby rotating the first and second pivot links 100 and 200 to the bicycle brake-operating position. That is, when the bicycle brake is operated in the lock mode of the locking unit 300, the stepped portion 350 of the second locking body 320 moves rotationally in a manner as described above, to be engaged with the engagement portion 341 of the rotational engagement member 340, so that the first and second locking bodies 310 and 320 are restrained from rotating, and the first and second pivot links 100 and 200 are restrained from rotating. Consequently, the bicycle brake is restrained in the operating position.

Figure 5:
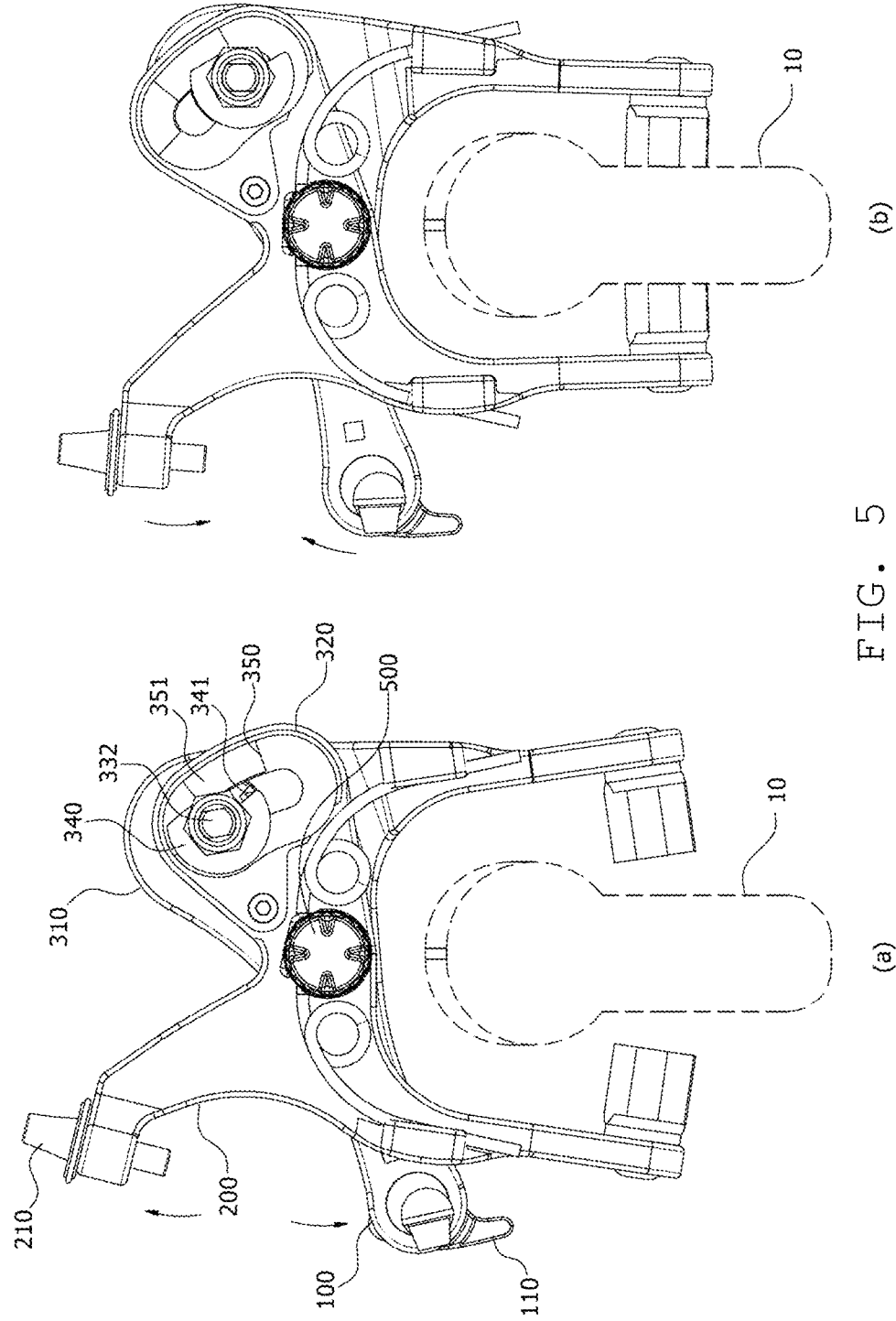
FIGS. 5 and 6 schematically illustrate operating positions of the bicycle locking device according to an exemplary embodiment.
Figure 6:
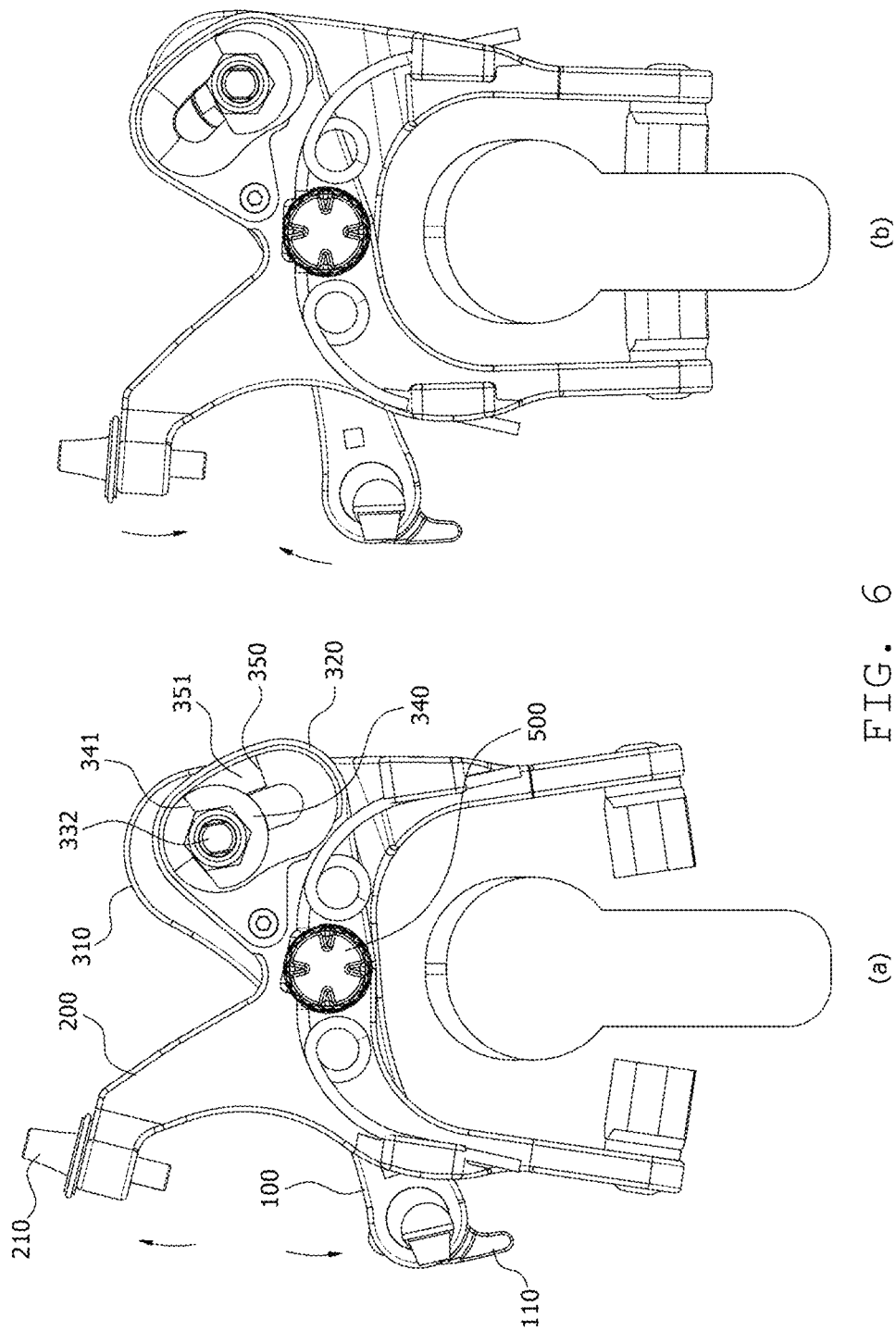

FIGS. 5 and 6 illustrate the bicycle brake before and after being operated, in the lock mode and the release mode of the locking unit 300.

FIG. 5 illustrates a case in which the locking unit 300 has operated in the release mode. As illustrated in (a) and (b) of FIG. 5, even if the brake is operated or the operation of the brake is released, the rotational engagement member 340 moves along the incline surface of the stepped portion 350, but the engagement portion 341 of the rotational engagement member 340 is not engaged with the stepped portion 350. Consequently, in the state in which the locking unit 300 is operated in the release mode, operation and release functions of the bicycle brake are properly performed in the manner of typical bicycle brakes.

FIG. 6 illustrates a case in which the locking unit 300 has operated in the lock mode. When the bicycle brake is released as illustrated in (a) of FIG. 6, the engagement portion 341 of the rotational engagement member 340 is disposed on the incline surface 351 of the stepped portion 350, but the engagement portion 341 is not engaged with the stepped portion 350. In this state, when the bicycle brake is operated as in (b) of FIG. 6, the first and second locking bodies 310 and 320 rotate, so that the stepped portion 350 and the engagement portion 341 are engaged with each other, in response to relative positions thereof being changed. Here, the engagement portion 341 rotational engagement member 340 is engaged with the stepped portion 350 while moving along the incline surface 351 of the stepped portion 350.

When the engagement portion 341 and the stepped portion 350 are engaged, the first and second pivot links 100 and 200 are restrained from rotating, as described above. Consequently, the bicycle brake is restrained in the operating position, unless the locking unit 300 is converted to the release mode using the key.

The structure of the bicycle brake may be slightly changed, depending on the type of bicycle. For example, displacements of rotational movement of the first and second pivot links 100 and 200 may be changed, depending on the thickness of the wheel of the bicycle. The locking unit 300 according to an exemplary embodiment can be used in the entirety of bicycle brakes having a variety of structures, by variously modifying the shape or thickness of the rotational engagement member 340 or the shape, position, or the like of the stepped portion 350 and the incline surface 351.

Figure 7:
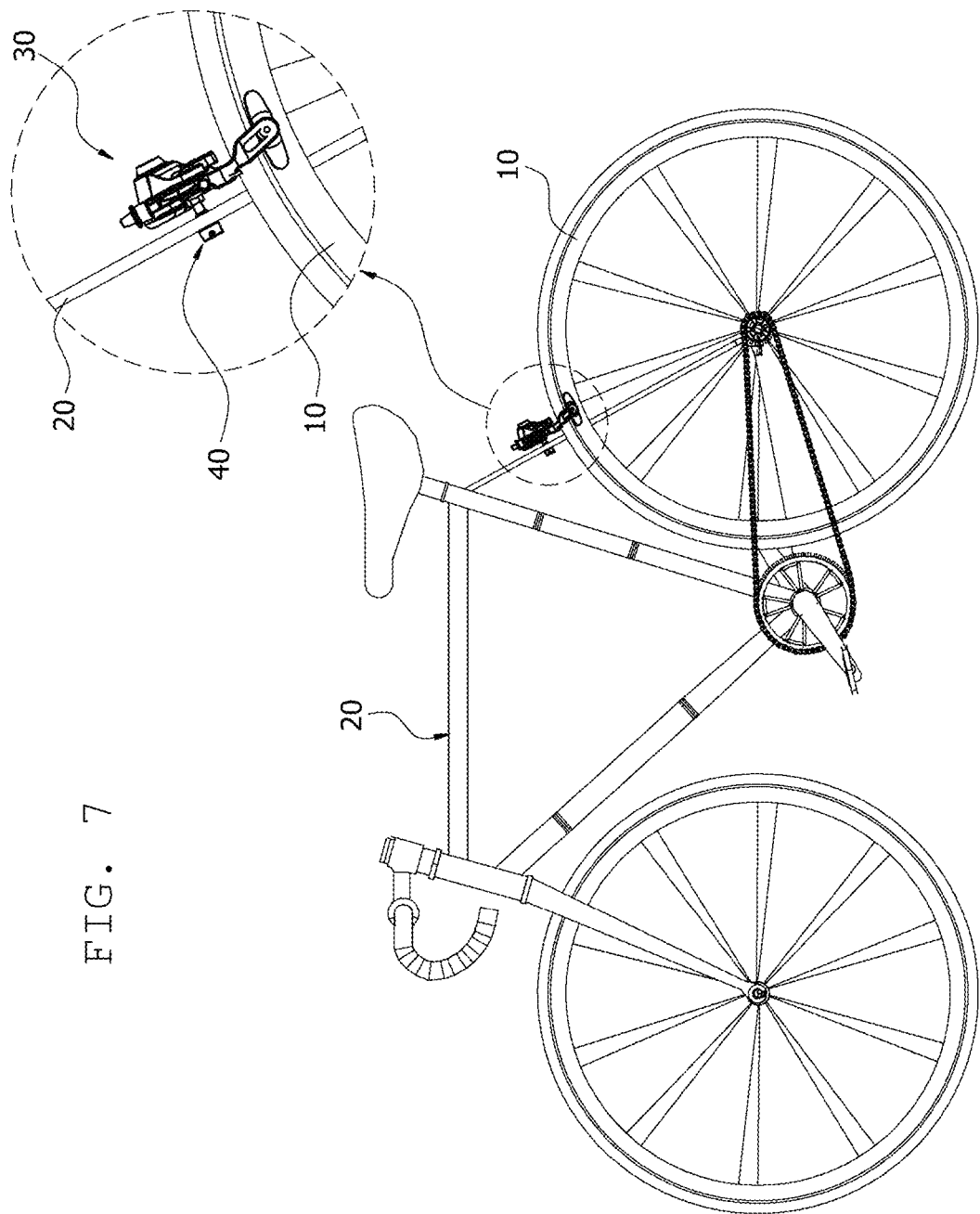
FIG. 7 schematically illustrates the bicycle brake assembly according to an exemplary embodiment, mounted on a bicycle frame.
Figure 8:
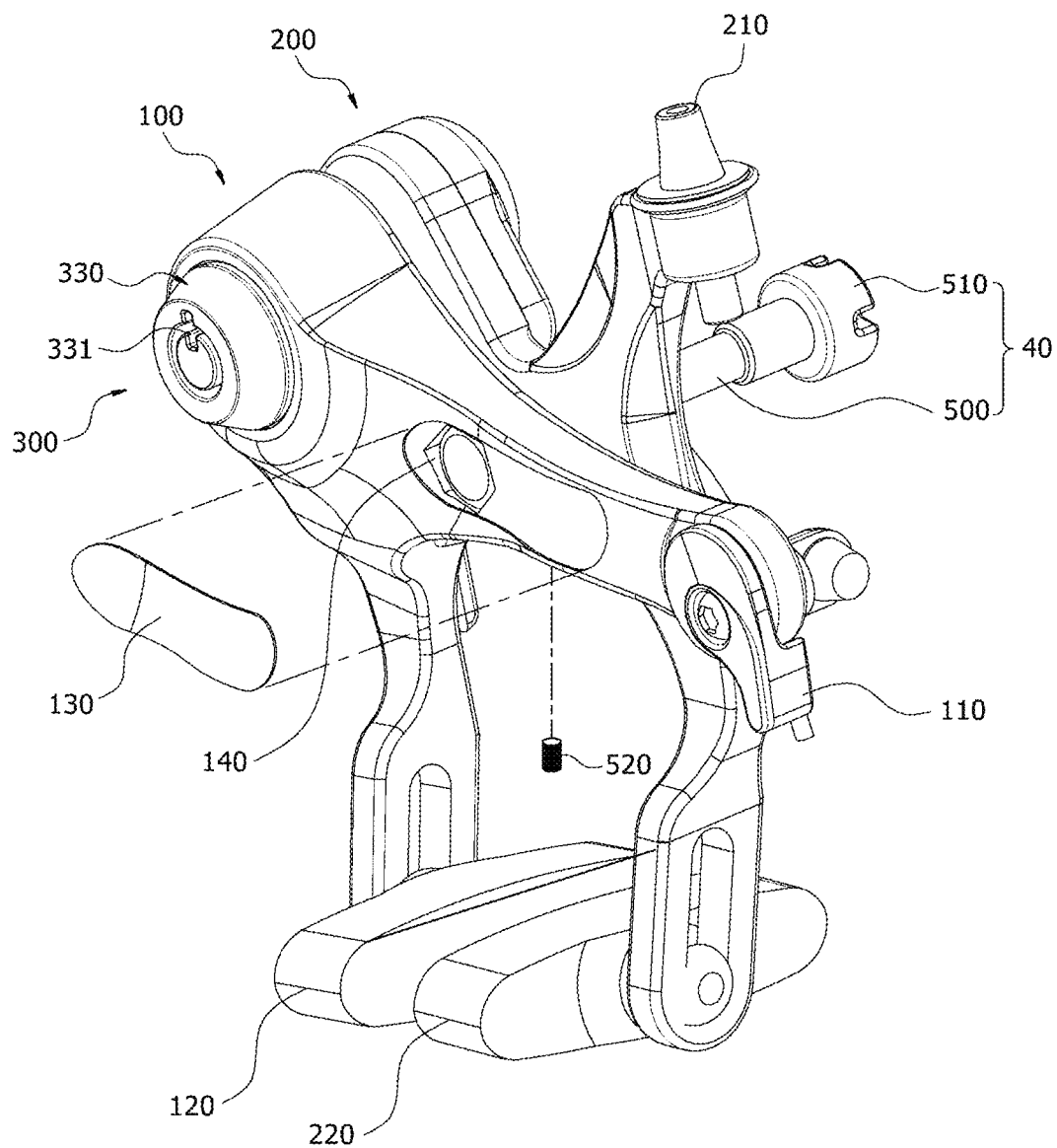
FIGS. 8 and 9 are perspective views schematically illustrating a configuration of the fastening means of the bicycle brake assembly according to an exemplary embodiment.
Figure 9:
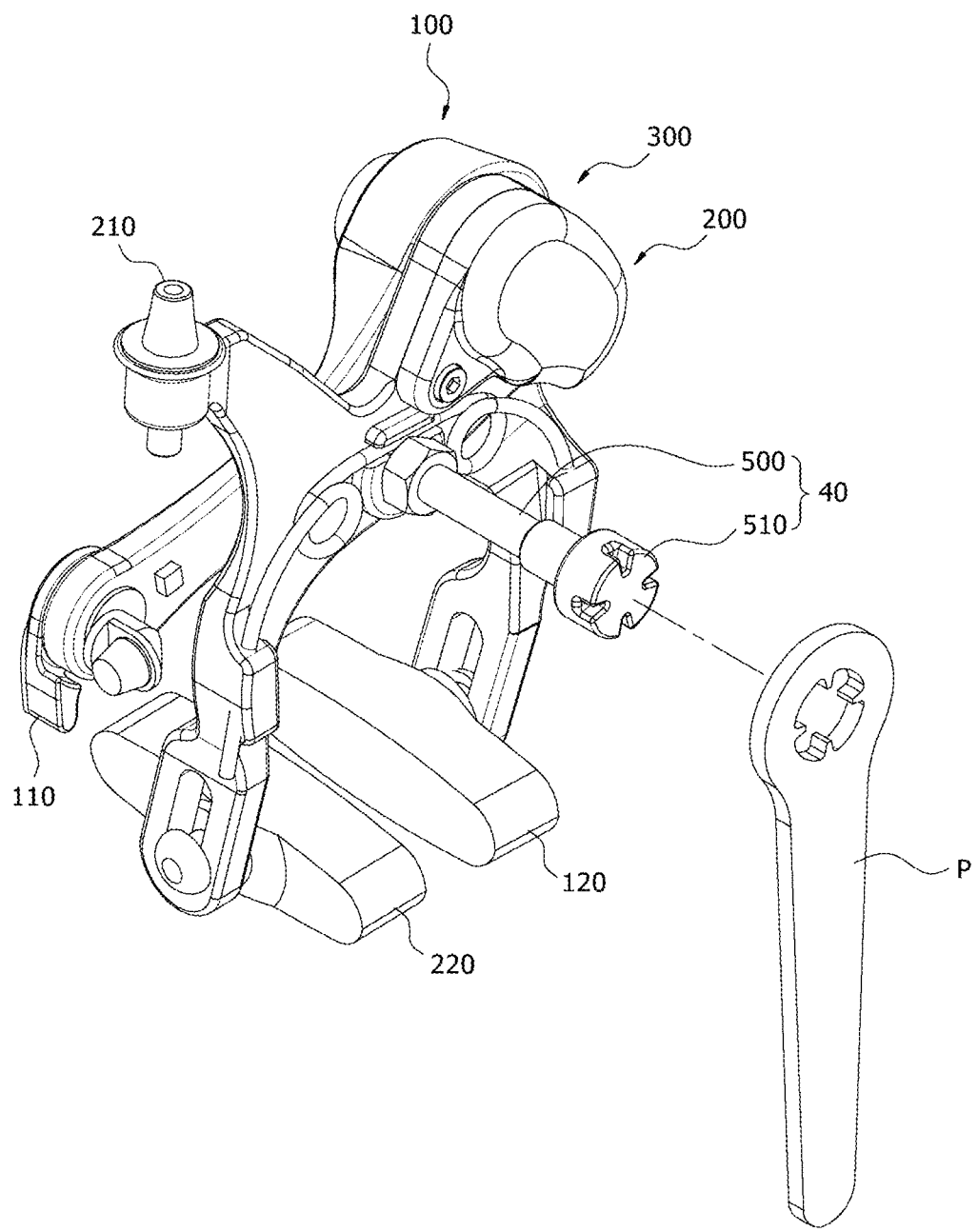

FIG. 7 schematically illustrates the bicycle brake assembly according to an exemplary embodiment, mounted on a bicycle frame, and FIGS. 8 and 9 are perspective views schematically illustrating a configuration of the fastening means of the bicycle brake assembly according to an exemplary embodiment.

The present disclosure provides the above-described bicycle brake locking device, as well as the bicycle brake assembly including the same.

As illustrated in FIG. 7, the bicycle brake assembly 30 according to an exemplary embodiment is connected to a bicycle frame 20 via a separate fastener 40 to be pressed against the bicycle wheel 10, thereby stopping the bicycle.

The fastener 40 is configured to couple the first and second pivot links 100 and 200 to the bicycle frame 20 while maintaining the first and second pivot links 100 and 200 to be rotatably coupled to each other. The fastener 40 includes a fastening bolt 500 extending through and fitted to at least one of the first and second pivot links 100 and 200 to extend through the bicycle frame 20 and a fastening nut 510 screw-engaged with the fastening bolt 500. The fastening bolt 500 may be configured to act as the rotary shaft of the first and second pivot links 100 and 200, as described above.

The fastener 40 having the above-described configuration may be configured so as not to be detached from the bicycle frame 20 without a dedicated tool.

In this regard, an outer circumferential surface of the fastening nut 510 may have a specific pattern, such that the fastening nut 510 can be rotated using a dedicated tool P having a pattern corresponding to the specific pattern. Accordingly, no person can detach the fastener 40 from the bicycle frame 20, except for a bicycle owner having the dedicated tool P.

In addition, the first pivot link 100 may be provided with an insertion hole 140 in the shape of a polygonal column, conforming to a head of the fastening bolt 500, and may be finished using a separate cover 130 coupled thereto.

In addition, although not shown, a catch recess (not shown) may be provided radially in an outer circumferential surface of one end of the fastening bolt 500, and an anti-separation bolt (e.g. a headless bolt without a bolt head) 520 may extend through one of the first and second pivot links 100 and 200 to be fitted into the catch recess of the fastening bolt 500. The fastening bolt 500 cannot be detached from the bicycle frame 20 unless the anti-separation bolt 520 is separated therefrom. This can more sufficiently prevent the bicycle brake assembly from being detached from the bicycle frame.

The foregoing descriptions have been presented in order to explain the certain principles of the present disclosure by way of example. A person skilled in the art to which the present disclosure relates could make various modifications and variations without departing from the principle of the present disclosure. The foregoing embodiments disclosed herein shall be interpreted as being illustrative, while not being limitative, of the principle and scope of the present disclosure. It should be understood that the scope of the present disclosure shall be defined by the appended Claims and all of their equivalents fall within the scope of the present disclosure.

The invention claimed is:

1. A bicycle brake locking device for a bicycle brake including first and second pivot links coupled to each other to be rotatable about a rotary shaft and brake pads coupled to predetermined ends of the first and second pivot links, the first and second pivot links being rotated to press the brake pads against a bicycle wheel when the bicycle brake is manipulated by a user, the bicycle brake locking device comprising a locking unit coupled to both the first and second pivot links to restrain the first and second pivot links from rotating in a state in which the first and second pivot links have been rotated to press the brake pads against the bicycle wheel, thereby restraining the bicycle brake in an operating position, wherein the locking unit selectively operates in a lock mode to restrain the first and second pivot links from rotating or a release mode to release rotational restraint of the first and second pivot links when manipulated by a user using a key, wherein the locking unit comprises:

a first locking body provided on a portion of the first pivot link to rotate integrally with the first pivot link, a second locking body provided on a portion of the second pivot link to overlap the first locking body so as to rotate integrally with the second pivot link; and a key block fixed to the first locking body and extending through and coupled to both the first locking body and the second locking body, the key block being configured to be manipulated using the key, wherein, when the first and second pivot links are rotated to the operating position of the bicycle brake in a state the key block has been manipulated to a lock mode, the first and second locking bodies are restrained from rotating, wherein the locking unit further comprises:

a rotational engagement member coupled to the key block to rotate and move integrally with the key block when the key block is rotationally manipulated, and having an engagement portion provided on a portion thereof, and a stepped portion provided on the second locking body to be engaged with the engagement portion of the rotational engagement member when the first and second pivot links are rotated to the operating position of the bicycle brake in the state in which the key block has been rotationally manipulated to the lock mode, wherein, as the engagement portion and the stepped portion are engaged with each other, the first and second pivot links are restrained from rotating, remaining in the operating position of the bicycle brake, and wherein the rotational engagement member is elastically pressed using a separate elastic member, in a direction in which the rotational engagement member is in close contact with a surface of the second locking body, on which the stepped portion is provided.

2. The bicycle brake locking device according to claim 1, wherein the stepped portion has an incline surface portion, and in a process of engagement between the engagement portion of the rotational engagement member and the stepped portion, the engagement portion of the rotational engagement member moves relatively along the incline surface portion to be engaged with the stepped portion.

3. A bicycle brake assembly comprising:

the bicycle brake locking device as claimed in claim 1; and a fastener coupling the first and second pivot links to the bicycle frame while maintaining the first and second pivot links to be rotatably coupled to each other, wherein the fastener comprises a fastening bolt extending through and fitted to at least one of the first and second pivot links to extend through the bicycle frame and a fastening nut screw-engaged with the fastening bolt, wherein a head of the fastening bolt or the fastening nut has a specific pattern such that the fastening bolt or the fastening nut is manipulated using a dedicated tool.

4. A bicycle brake assembly comprising:
the bicycle brake locking device as claimed in claim 2; and
a fastener coupling the first and second pivot links to the bicycle frame while maintaining the first and second pivot links to be rotatably coupled to each other,
wherein the fastener comprises a fastening bolt extending through and fitted to at least one of the first and second pivot links to extend through the bicycle frame and a fastening nut screw-engaged with the fastening bolt, wherein a head of the fastening bolt or the fastening nut has a specific pattern such that the fastening bolt or the fastening nut is manipulated using a dedicated tool.

\* \* \* \* \*